United States Patent [19]

Angelbeck

[11] 4,105,463
[45] Aug. 8, 1978

[54] LIME-FLY ASH-AGGREGATE-SLUDGE PAVING MATERIAL

[75] Inventor: Donald Irvin Angelbeck, Perrysburg, Ohio

[73] Assignee: The University of Toledo, Toledo, Ohio

[21] Appl. No.: 639,893

[22] Filed: Dec. 11, 1975

[51] Int. Cl.² ............................................. C04B 1/00
[52] U.S. Cl. .................... 106/120; 106/118; 106/286; 106/900
[58] Field of Search ................. 106/85, 109, 118, 120, 106/273 R, 286, 287 SS

[56] References Cited

U.S. PATENT DOCUMENTS

| | | | |
|---|---|---|---|
| 3,720,609 | 3/1973 | Smith et al. | 106/109 |
| 3,785,840 | 1/1974 | Minnick et al. | 106/118 |
| 3,852,084 | 12/1974 | Webster et al. | 106/287 SS |

OTHER PUBLICATIONS

Kirk-Othmer, Encyclopedia of Chem. Tech., 2nd Ed., 1967, vol. 12, p. 423.

*Primary Examiner*—Lorenzo B. Hayes
*Attorney, Agent, or Firm*—Barker, Emch, Schaffer & Todd Co.

[57] ABSTRACT

A composition and method for producing an improved lime-fly ash-aggregate is disclosed. The composition is prepared by mixing together lime, flyash, graded aggregate, adding water, and from 0.5 to 4 percent, based on total dry weight, of sludge from a water treatment plant. The mixture is placed on top of a prepared subgrade, spread uniformly, and compacted to a high degree of relative density to provide the main load-carrying component of a road, airport runway, parking lot or the like.

4 Claims, No Drawings

LIME-FLY ASH-AGGREGATE-SLUDGE PAVING MATERIAL

BACKGROUND OF THE INVENTION

This invention relates to an improved lime-fly ash-aggregate (LFA) pozzolanic composition which is useful as a load-carrying base for roads, airport runways, parking lots and the like.

As the cost of raw materials has increased, greater interest in utilization of waste materials as a means of providing cost benefits has also increased. This interest in waste utilization has also been spurred by the increasing cost and difficulty of disposal of waste materials in view of increasingly stringent pollution standards. In addition, utilization of waste materials also helps to conserve natural resources.

An outstanding example of utilization of waste material is the use of fly ash from the combustion of powdered coal, recovered from power plant flue gases by mechanical and/or electrostatic precipitation. One economical use of fly ash has been its use in LFA mixtures.

In order to obtain maximum integrity and stability in modern highway construction, a series of layers is built-up. The construction normally comprises a subgrade or road bed, a sub-base, a base course and a wearing course. The sub-base provides uniform strength, which allows the base course to be a uniform and reasonable thickness. The base course furnishes nonyielding support to the wearing course, and helps to transfer and distribute wheel load to the subgrade. The wearing course, which can be concrete or asphalt, protects the lower layers from traffic load, from weathering and from water infiltration.

Because of the importance of the support provided by the base course, and because of the large quantities of materials used in highway construction, engineers are interested in economical materials which possess the desired strength. One economical material widely used involves a technology used by the Romans and others many years ago, the use of pozzolanic materials. While the Romans used natural pozzolans such as volcanic ash or shale, modern pozzolans are generally fly ash.

A pozzolan can be defined as a material which reacts with lime in the presence of moisture to form a cementitious material, although the pozzolan possesses little or no cementitious properties in itself. Although the chemistry of the lime-pozzolan reaction is complicated and not completely understood at present, it is believed that the silica and alumina in the fly ash react with the calcium oxide or calcium hydroxide in the lime to form calcium silicate and calcium aluminate gels, along with other complex compounds involving alkalis, iron and aluminum. Sufficient water must be present for the reaction to occur. The rate of reaction decreases with decreased temperatures and is retarded to a great extent at temperatures lower than 40° F. The presence of large amounts of organic materials may be deleterious to the pozzolanic reaction.

As previously referred to, disposal of waste products from industrial processes presents a challenge to more efficient use of natural resources. Large amounts of waste products are produced by the treatment of domestic and industrial water which involves concentration of pollutants from raw water into a smaller volume and subsequent separation from the treated water by means of inorganic and/or organic coagulants and precipitating agents for clarifying and/or softening the water. The resulting solids-water suspension is referred to as a "sludge".

Heretofore, a common practice in disposing of sludge was discharge of the sludge to surface water, although a small amount of sludge has been disposed of by recalcination. The 1972 Water Pollution Control Act amendments established federal standards which provide industrial discharge guidelines. These guidelines call for the use of best practical control technology by July, 1977, best available control technology by July, 1983, and elimination of pollutant discharges by 1985.

Water softening or the removal of calcium and magnesium ions from water can be accomplished by treatment with lime or lime-soda ash. Addition of lime to water which contains carbonates or bicarbonates causes precipitation of $CaCO_3$ and $Mg(OH)_2$. Generally, the most significant portion of the lime sludge produced is calcium carbonate, together with smaller amounts of silicates, organic matter, clay or salt, and hydoxides of iron, magnesium, manganese and aluminum, depending on the ratio of calcium to magnesium in the water, the type and amount of other matter in the water prior to treatment, and whether or not other inorganic or organic coagulants are used concurrently to increase the sludge settling or dewatering efficiency. Inorganic coagulants include alum, aluminum sulfate, ferric sulfate, ferric chloride, ferrous sulfate, ferrous chloride, colloidal activated silica or bentonite. Organic coagulants include cationic, anionic or nonionic organic polyelectrolytes which are available commercially.

The instant invention discloses that incorporation of water treatment sludge into an LFA mixture increases compressive strength and leachability resistance of the mixture.

SUMMARY OF THE INVENTION

The instant invention is based upon the discovery of an improved lime-fly ash aggregate composition and a method for providing an improved cementitious product. The composition contains from about 2 to 8 percent lime, from about 8 to 36 percent fly ash, from 66 to 90 percent aggregate and from 0.5 to 4 percent, based on total weight of the LFA mixture, of sludge from a water treatment plant. The relative proportions can be varied within these limits depending upon the specific use desired for the composition.

Accordingly, it is an object of this invention to provide an improved lime-fly ash-aggregate composition.

It is also an object of this invention to provide a method for constructing a road having an improved load-carrying base that has increased resistance to leachability.

It is a further object of this invention to provide a method for utilization and stabilization of sludge from a water treatment facility.

The instant invention will be more fully understood from the following Examples which describe preferred specific embodiments. In the Examples, as elsewhere herein, the terms "percent" and "parts" refer to percent and parts by weight, unless otherwise indicated. All sizing is reported as standard mesh per linear inch, U.S. Standard screen series.

The ASTM has established specifications for various construction materials. Specifications are given in ASTM designation C 593 for LFA mixtures; the preparation and testing of LFA compositions described hereinafter are based on ASTM C 593.

EXAMPLE I

A batch was mixed consisting of 3 percent by weight lime, 10.7 percent by weight fly ash, 85.6 percent by weight aggregate and 0.5 percent by weight sludge, the optimum amount for this specific mix and sludge. The optimum amount of moisture needed to provide the optimum mixture density was determined by the procedure set forth in ASTM C 593, Section 8.3, to be 8.5 percent by weight of the mixture. A batch sufficient in amount to make three 4 inch by 4.6 inch cylinders was prepared by mixing the dry LFA materials and sludge together for about 1 minute and then adding 8.4 percent by weight water. The batch was then further mixed for an additional 3 minutes.

The cylinders were molded as described in ASTM C 593, Section 8.4, removed from the mold, and placed in a cabinet with forced-air circulation maintained at 100° F and 100 percent relative humidity for a 7-day period. After 7 days, the cylinders were removed and submerged in water for 4 hours, drained on a non-absorbent surface, capped and tested by ASTM Method C 39 on a Tinius Olsen Universal Testing Machine. The average compressive strength of the cylinders, designated as Sample 1, was found to be 510 pounds per square inch.

Three cylinders were prepared as described above. After completion of 12 freeze-thaw cycles at a temperature of −33° F, as described in ASTM C 593, Section 8.7, the cylinders were immersed in water for 4 hours and tested for compressive strength. The average compressive strength of the test cylinders, designated as Sample 2, was found to be 590 pounds per square inch. The average percent dry weight loss was found to be 0.89.

Control Samples, consisting of 3 percent by weight lime, 11.0 percent by weight fly ash and 86.0 percent by weight aggregate were prepared as described above. The optimum moisture was determined to be 8.6 percent by weight of the mixture. The average compressive strength of the control cylinders was found to be 340 pounds per square inch. Freeze-thaw compressive strength after 12 cycles was found to be 520 pounds per square inch; the average percent dry weight loss was found to be 0.92. The test results indicated that addition of 0.5 percent by weight of sludge produced a 7-day compressive strength increase of 50 percent. Only a small increase in freeze-thaw compressive strength was obtained. However, as shown in Example II, samples containing 1 percent sludge had freeze-thaw strength of 595 psi or approximately 13 percent increase in strength over control freeze-thaw strength.

The relative leachability was measured as the level of dissolution, under accelerated test conditions, of the amount of material lost from the cylinder during the freeze-thaw cycles. The relative leachability is determined as the specific conductivity and total organic carbon of the soluble fraction. Both the specific conductivity and total organic carbon as described below, were measured after one-day contact at room temperature and after two and four autoclavings.

The relative leachability was determined by passing the material brushed from the surfaces of the test cylinders during the freeze-thaw test through a U.S. standard sieve No. 50. Ten grams of material passing the sieve from each test mix were suspended in 500ml of deionized water. After one day of dispersed contact at room conditions, a 150 ml portion of mixed suspension was removed from each test sample. The removed water and dissolved fraction were analyzed for pH, specific conductivity and total organic carbon. The remaining 350 ml portion of each sample was autoclaved for two 30-minute periods at 15 pounds per square inch and 230° F. A second 150 ml portion of mixed suspension was removed from each sample and tested as before. The remaining portions were autoclaved two additional 30-minute periods and were then tested in the same manner. Leachability test results for Sample 2 and the control sample are presented below:

TABLE I

| | Leachability Results-Dissolved Fraction | | | | | |
|---|---|---|---|---|---|---|
| | Conductivity μ mhos/cm | | | Total Organic Carbon mg/l | | |
| Sample | A* | B** | C*** | A | B | C |
| 2 | 310 | 340 | 340 | 9 | 17 | 20 |
| Control | 400 | 390 | 410 | 7 | 14 | 19 |

*After 1 day contact, room temperature
**After 2 autoclave cycles
***After 4 autoclave cycles A unique characteristic of LFA mixtures is their inherent ability to heal or re-cement across cracks by a self-generating mechanism, referred to as autogenous healing. The degree to which autogenous healing will occur is dependent upon factors such as age, degree of contact of fractured surfaces, curing conditions, moisture conditions and availability of lime and fly ash. This autogenous healing characteristic gives LFA mixtures a decreased susceptibility to deterioration under repeated loading and increased resistance to attack by the elements.

The following test results indicating improved autogenous healing of the LFA-sludge compositions were obtained:

TABLE II

| | 7 Day Compressive Strength (psi) | Compressive Strength 270 Days After Break (psi) | Freeze-Thaw Compressive Strength (psi) | Freeze-Thaw Compressive Strength 238 Days After Break (psi) |
|---|---|---|---|---|
| Control | 340 | 391 | 520 | 559 |
| Sample 1 | 510 | 673* | | |
| Sample 2 | | | 590 | 657 |

*Indicates 249 days

The data shown in the Table above indicates that presence of 0.5 percent of sludge in an LFA mixture enhanced the autogenous healing characteristic of the composition to an unexpected extent.

The lime used meets ASTM specification C-207-49, type N. Lime produced from limestone is suitable for LFA mixtures, although dolomitic limestone or dolomite can also be used. It is produced commercially by "lime-burning" or calcining crushed limestone. The term "lime" is used to indicate quicklime, hydrated lime or slaked lime. The term quicklime is used to indicate a calcined material, the major portion of which is calcium oxide or calcium oxide in association with a lesser amount of magnesium oxide, capable of slaking with water. The term hydrated lime or slaked lime indicates a dry powder obtained by treating quicklime with enough water to satisfy its chemical affinity for water under the conditions of its hydration. Hydrated lime consists essentially of calcium hydrate or a mixture of calcium hydrate and/or magnesium oxide and/or magnesium hydroxide.

Fly ash suitable for use in the present invention is a finely divided ash residue produced by the combustion of pulverized coal. The ash is carried off with the gases exhausted from the furnace in which the coal is burned, and is usually collected from the gases by means of suitable precipitation apparatus. The amounts of fly ash in the mix are influenced by the quantity required to produce the required dense graded mixture by filling voids in the aggregate. Effective LFA mixtures have been prepared with fly ash contents ranging from 8 to 36 percent. The fly ash used in the instant invention had the following characteristics:

| | |
|---|---|
| Moisture | 0.3% |
| Loss on ignition | 4.8% |
| Water-soluble fraction | 3.6% |

The fly ash was in a finely divided state such that at least about percent passed through a 200 mesh sieve.

The aggregate used was crushed limestone which was mechanically sorted into five size fractions. The aggregate utilized in the instant invention had the following particle sizing:

| Sieve Size (U.S. Standard) | Percent Passing |
|---|---|
| ¾ inch | 100 |
| ⅜ inch | 65.1 |
| #4 | 35.2 |
| #50 | 8.1 |
| #200 | 4.3 |

Aggregates which have been successfully used in LFA mixtures cover a wide range of types and gradations, including sand, gravels, crushed stones, and several types of slag. Gradation of the aggregate should be such that a dense mixture will be produced which is capable of compaction to high density when mixed with the lime, pozzolan and sludge. The resulting mixture should be mechanically stable under compaction equipment and capable of being compacted in the field to the required high density. The aggregate should consist of hard, durable particles, free from soft or disintegrated pieces.

The sludge utilized in the instant invention was generated by alum coagulation and lime softening in a water treatment plant.

The water treatment involved clarification, softening, rapid sand filtration, chlorination and fluoridation. After addition of activated carbon, dosages of alum and slaked lime were added. Soda ash can be added if the water's noncarbonate hardness is high. After addition of the above chemicals, the water flows through flocculation and sedimentation basins, after which carbon dioxide and polyphosphates are added to stabilize the water against further precipitation of calcium carbonate. The water is then passed through sand filters and is finally chlorinated and fluoridated prior to distribution. The water is softened from an average hardness of 130mg/l as $CaCO_3$ to about 70mg/l as $CaCO_3$ during the treatment process.

The sludge used in the specific examples was dewatered by centrifuging. Gravity thickening, vacuum filtration, and air drying can also be used to achieve the concentration needed for incorporation into LFA mixtures. The sludge can also be dried for convenient storage or shipment.

The sludge was allowed to settle approximately four days, after which the supernatant liquid was siphoned off, and the thickened sludge dewatered by means of a centrifuge. The centrifuged sludge mixture contained 37 percent solids on a weight per weight basis (w/w). The sludge had the following chemical analysis:

TABLE III

| Component | Acid-Soluble % of Total (w/w) | Acid-Insoluble % of Total (w/w) | Sum % of Total (w/w) |
|---|---|---|---|
| Si as $SiO_2$ | 6.0 | none | 6.0 |
| Al as $Al_2O_3$ | 0.4 | 2.6 | 3.0 |
| Fe as $Fe_2O_3$ | none | none | none |
| P as $PO_4$ | 0.1 | NA* | 0.1 |
| S as $SO_4$ | trace | NA | trace |
| Mg as MgO | 1.5 | 0.5 | 2.0 |
| Ca as CaO | 41.8 | NA | 41.8 |
| Total Organic Carbon | | | 3.0 |
| Total Carbon | | | 7.0 |
| Benzene-Soluble Fraction | | | 0.7 |

*NA = Not Applicable

Table III expresses the acid-soluble aluminum, magnesium, and calcium compounds as $Al_2O_3$, MgO, and CaO, respectively. However, in the dried sludge these three components were probably in the forms of $Al(OH)_3$, $Mg(OH)_2$, and $CaCO_3$. By expressing the percentages of acid-soluble aluminum, magnesium and calcium in terms of the latter compounds the composition of the sludge was estimated as given in the following Table:

TABLE IV

| Sludge Composition Estimated From Chemical Analysis | |
|---|---|
| Component | % of Total (w/w) |
| Acid-soluble fraction: | |
| Al as $Al(OH)_3$ | 0.6 |
| Mg as $Mg(OH)_2$ | 2.2 |
| Ca as $CaCO_3$ | 74.7 |
| Si as $SiO_2$ | 6.0 |
| P as $PO_4$ | 0.1 |
| Acid-insoluble fraction: | |
| Al as $Al_2O_3$ | 2.6 |
| Mg as MgO | 0.5 |
| Loss on ignition minus $H_2O$ in $Al(OH)_3$ and $Mg(OH)_2$ | 7.3 |
| Total | 94.0 |

The loss on ignition (LOI) was added to the total because it includes volatile organic materials and water of hydration contained in the sludge, and therefore contributed to the total dry weight. $Al(OH)_3$ and $Mg(OH)_2$ lose water at 300° and 350° C, respectively, so the amount of water in these two components was deducted from the LOI to prevent duplication. Phosphorus was not deducted from LOI because phosphorus is not lost during combustion if sufficient ash is present.

The data indicates a 6.0 percent loss in accountable components. This discrepancy is thought to be a result of inefficient recoveries of all components listed in the Table above, the presence of minor components for which analyses were not made, and experimental error.

The difference between the total carbon and the total organic carbon in Table II equalled four percent of the sludge solids. This amount of inorganic carbon is not sufficient to account for the carbon in the calcium carbonate. The cause of the discrepancy may have been due to either experimental error, in that very small quantities of sludge were used in the carbon analyses, or to the possibility that a portion of the calcium in the sludge was not in the form of calcium carbonate.

The sludge residue was measured at the conditions shown in the Table below. Because the quantity of suspended solids in the sludge greatly exceeded that of the dissolved solids, the dissolved matter concentration could not accurately be calculated as the difference between total and suspended residues. Therefore, the dissolved solids content of the sludge was assumed to be equal to the dissolved solids concentration in the supernatant water.

| Sludge Solids Concentrations, mg/l | | | | |
|---|---|---|---|---|
| | Initial Sludge | Settled Sludge (1 day) | Condition Settled Sludge (4 days) | Supernatant (4 days) |
| Total Solids | 37,000 | 121,000 | 128,000 | 140 |
| Total Suspended Solids | 36,900* | | | 46 |
| Total Dissolved Solids | | | | 94 |
| Total Fixed Solids | 34,000 | 114,000 | 120,000 | 82 |
| Fixed Suspended Solids | 33,950* | | | 32 |
| Fixed Dissolved Solids | | | | 50 |
| Total Volatile Solids | 3,000 | 7,000 | 8,000 | 58 |
| Volatile Suspended Solids | 2,960* | | | 14 |
| Volatile Dissolved Solids | | | | 44 |

*Calculated from dissolved residue of 4-day supernatant

Although a sludge concentration of 10,000 mg/l is conventionally converted to 1 percent by weight, a significant error is made when using this practice with large concentrations of heavy solids. The specific gravity of lime softening sludge solids has been reported by researchers to be about 2.75. Therefore, the overall specific gravity of the sludge increases significantly with increased solids concentration. For example, if a lime softening sludge has a composition of 350,000 mg/l, the weight percentage of sludge is 28.6 percent, assuming the specific gravity of the solids is 2.75. In order to avoid such ambiguities, all concentrations measured on a weight per volume (w/v) basis are expressed as mg/liter, and concentrations measured on a weight per weight (w/w) basis are expressed as percentages.

EXAMPLE II

A series of LFA-sludge mixtures was prepared and tested as disclosed in Example I. The lime, fly ash, aggregate and sludge used has the composition set forth in Example I. The proportions were varied to determine the effect of varying the level of sludge incorporation in LFA mixes having a constant lime content, and to determine the effect of substituting dewatered sludge for varying amounts of lime.

TABLE V

| Sample | % Lime | % Sludge Solids | % Fly ash | % Aggregate | Optimum Moisture Content |
|---|---|---|---|---|---|
| Control | 3.0 | — | 11.0 | 86.0 | 8.6 |
| 3 | 3.0 | 1.0 | 10.9 | 85.1 | 8.4 |
| 4 | 3.0 | 2.0 | 10.8 | 84.2 | 8.4 |
| 5 | 3.0 | 3.0 | 10.7 | 83.3 | 8.4 |
| 6 | 2.0 | 1.0 | 11.0 | 86.0 | 8.4 |
| 7 | 1.0 | 2.0 | 11.0 | 86.0 | 8.3 |
| 8 | 0 | 3.0 | 11.0 | 86.0 | 8.3 |

The following test results for both compressive strength and freeze-thaw cycle strength are presented in Table VI.

TABLE VI

| | | Freeze - Thaw Cycle | |
|---|---|---|---|
| Sample | 7-Day Compressive Strength (psi) | Compressive Strength (psi) | Average % Dry Weight Loss |
| Control | 340 | 520 | 0.92 |
| 3 | 475 | 595 | 0.88 |
| 4 | 450 | 550 | 0.85 |
| 5 | 385 | 460 | 1.36 |
| 6 | 220 | — | — |
| 7 | 95 | — | — |
| 8 | 0 | — | — |

Leachability test results of dissolved fraction are presented in Table VII below.

TABLE VII

| Sample | Specific Conductivity μ mhos/cm | Total Organic Carbon mg/l | pH |
|---|---|---|---|
| Control | | | |
| A* | 400 | 7 | 9.6 |
| B** | 390 | 14 | 9.4 |
| C*** | 410 | 19 | 9.5 |
| 3 | | | |
| A | 330 | 10 | 9.7 |
| B | 320 | 22 | 9.3 |
| C | 360 | 21 | 9.5 |
| 4 | | | |
| A | 350 | 8 | 9.7 |
| B | 340 | 25 | 9.4 |
| C | 350 | 24 | 9.7 |
| 5 | | | |
| A | 350 | 13 | 9.7 |
| B | 350 | 26 | 9.2 |
| C | 390 | 25 | 9.4 |

*After 1 day contact, room temperature
**After 2 autoclave cycles
***After 4 autoclave cycles The test results reported in Example I and Example II indicate that addition of dewatered sludge to LFA mixtures increases the 7-day compressive strength and enhances the autogenous healing characteristics of the LFA mixtures. The 7-day compressive strength decreased with decreasing lime content. The strength of LFA mixtures is dependent upon the lime content, and since the substitution of sludge solids does not bring about a pozzolanic reaction as lime does, the amount of pozzolanic activity decreased as the lime content decreased. Because of the decrease, LFA mixtures containing less than 3 percent lime will have an undesirably low compressive strength.

The results indicate that even though the sludge did not function as an equivalent replacement for lime, it did increase the compressive strength of the mixes containing a constant amount of lime. For example, at a 3 percent lime level, Sample 1 (0.5 percent sludge) showed a fifty percent increase in average 7-day compressive strength over the Control Sample.

Sludge incorporation above the optimum level led to a slight decrease in strength compared to the sample containing 0.5 percent sludge; however, the compressive strength of Samples 3 and 4 was greater than the compressive strength of the Control Sample. It is theorized that additional sludge may have excessively increased the proportion of fine materials in the mixture, creating a reduction of interparticle friction between larger aggregate, which would tend to produce a decrease in compressive strength. It is also theorized that the presence of excessive sludge could also physically separate the reactants which form the pozzolanic reaction, which could decrease the reaction rate and/or the coherence of the reaction products.

The mechanism whereby the increase in compressive strength and increase in autogenous healing is achieved by incorporation of sludge is not presently understood. However, a review of the test data obtained, experimental procedures used, and the known chemistry of pozzolanic reactions is helpful.

The test procedures indicated that there was no increase in the dry density of the sludge-containing compositions in comparison with the Control Sample, indicating that the strength increase is not attributable merely to increased fine material which would provide better compactability of the mixture.

The greater improvement in the 7-day compressive strengths obtained by sludge incorporation in comparison with the increase in compressive strength obtained in the freeze-thaw samples may indicate that the sludge functioned as an accelerator of the pozzolanic reaction.

This hypothesis is supported by the correlation between the 7-day compressive strength and the mortar solubilities, as measured by specific conductivity. Since the cementitious products of a pozzolanic reaction are stable and insoluble, an acceleration of the reaction would lead to decreased solubility (decreased specific conductivity) with a corresponding increase in strength; this is in accord with the test results reported herein.

Since calcium carbonate, an alkaline-earth carbonate was the most abundant material in the sludge, it is likely to have been in part responsible for the increase in strength obtained. It is known that calcium sulfate reacts with pozzolanic materials containing reactive alumina to form quaternary aluminates. A reasonable hypothesis for the increase in strength obtained may be that the incorporation of limited amounts of calcium carbonate and aluminum compounds contained in sludge produces minerals which develop strength at an earlier stage than do the normally formed reaction products. Example III hereinafter indicates that other oxides or hydroxides derived from mineral acid salts, such as those of iron, will function in a similar manner. For example, the mineral acid salt can be $Al_2(SO_4)_3$, $Fe_2(SO_4)_3$, $FeSO_4$, $FeCl_3$ and $FeCl_2$.

It is probable that the strength improvement is not attributable to a cementitious effect produced by the presence of calcium carbonate alone. Studies such as "Mechanisms of Soil-Lime Stabilization; An Interpretive Review", "Highway Research Record No. 92", (1965) have discounted the hypothesis that formation of calcium carbonate is a beneficial product of the lime-pozzolan reaction. In fact, test experiments are often sealed from the atmosphere during curing, to prevent carbonation of the lime. The lack of strength in the mixture containing no lime (Sample 8) is a further indication that the sludge itself did not act as a direct cementitious material.

It is believed that the strength increase effect is due to a set of secondary complex reactions between several of the ingredients contained in the sludge and the lime-fly ash pozzolanic reaction.

It is apparent that water treatment sludges vary in composition, depending upon the chemical compounds present in the water and the coagulants and other chemicals added during treatment of the water. In order to establish parameters for the composition of the sludge useful in the instant invention, various synthetic sludges were prepared as described below. The samples were tested as described in Example I.

EXAMPLE III

A one percent equivalent portion of a synthetic sludge, having the composition shown in the Table below, was added to a series of LFA mixtures similar in composition to those previously described.

TABLE VIII

| | Synthetic Sludge Mixes | | | | | | | |
|---|---|---|---|---|---|---|---|---|
| | Percentage of Amount of Dry Sludge Solids in Sludge Material* | | | | | | | |
| Sample No. | $CaCO_3$ as CaO (from $CaCO_3$) | Mg as MgO (from $MgSO_4 \cdot 7H_2O$) | Si as $SiO_2$ (from $H_2SiO_3$) | Al as $Al_2O_3$ (from $Al_2(SO_4)_3$) | Fe as $Fe_2O_3$ (from $FeCl_3 \cdot 6H_2O$) | P as $PO_4$ (from $K_2HPO_4$) | Mn as MnO (from $MnSO_4 \cdot 7H_2O$) | S as $SO_4$ (from $MnSO_4 \cdot 7H_2O$ added) |
| 9 | 30 | 1 | 1 | 3 | 0 | 0.2 | — | — |
| 10 | 90 | 1 | 1 | 3 | — | — | — | — |
| 11 | 50 | 10 | 10 | 0 | 5 | — | — | — |
| 12 | 50 | 10 | 10 | 3 | — | 1 | 2 | 0.5 |

*Remainder water

The following test results were obtained.

TABLE IX

| Sample No. | 7-Day Compressive Strength | Percent Increase Over Control |
|---|---|---|
| Control | 385 | |
| 9 | 480 | 24.7 |
| 10 | 445 | 15.6 |
| 11 | 491 | 27.5 |
| 12 | 503 | 30.6 |

Further experimental tests were conducted using a water treatment sludge obtained from a source different than that previously described in conjunction with a different LFA composition.

The sludge utilized was generated by ferric chloride, coagulation and lime softening in a water treatment plant obtaining water from a water source different that that previously described. The water treatment involved clarification, permanganate oxidation, softening, rapid sand filtration, chlorination and fluoridation. After addition of activated carbon, dosages of ferric chloride, slaked lime and potassium permanganate were added. Soda ash can be added. After addition of the above chemicals, the water flowed through flocculation and sedimentation basins, after which carbon dioxide and polyphosphates were added to stabilize the water against further precipitation of calcium carbonate. The water was then passed through sand filters and was chlorinated and fluoridated prior to distribution.

The sludge had the following estimated composition:

TABLE X

| Component | % of Total (w/w) |
|---|---|
| $CaCO_3$ | 88.5 |

TABLE X-continued

| Component | % of Total (w/w) |
|---|---|
| Activated carbon | 0.3 |
| Mg(OH)$_2$ | 6.6 |
| Remainder | 4.6 |

The lime, fly ash and aggregate used had the composition and characteristics previously described. The composition contained 3 percent by weight lime, 15 percent by weight fly ash, and from 78–82 percent aggregate. All LFA-sludge compositions were prepared as described in detail in Example I; and were prepared using the appropriate optimum moisture content as referred to earlier.

TABLE XI

| Sample No. | Level of Sludge Incorporation % | Used Wet | Used Dry | Average 7 Day Compressive Strength (psi) |
|---|---|---|---|---|
| Control-13 | 0 | — | — | 551 |
| 14 | 1 | X | | 571 |
| 15 | 2 | X | | 686 |
| 16 | 3 | X | | 406 |
| 17 | 4 | X | | 347 |
| 18 | 2 | | X | 710 |

The addition of up to 3 percent by weight of water-treatment sludge increased the 7-day compressive strength of most of the samples tested.

What I claim is:

1. In a pozzolanic paving material consisting essentially of lime, fly ash, aggregate, and water; the improvement consisting of from 0.5 to 4 percent by weight, based on said lime, fly ash and aggregate, of a water treatment sludge consisting essentially of at least one compound selected from the group consisting of calcium oxide and calcium carbonate, and at least one compound selected from the group consisting of the oxides and hydroxides of aluminum and iron.

2. A pozzolanic paving material according to claim 1 consisting essentially of from 2 to 8 percent by weight lime, from 8 to 36 percent by weight fly ash, from 66 to 90 percent by weight aggregate, water, and from 0.5 to 4 percent by weight, based on said lime, fly ash and aggregate, of water treatment sludge consisting essentially of at least one compound selected from the group consisting of calcium oxide and calcium carbonate, and at least one compound selected from the group consisting of the oxides and hydroxides of aluminum and iron.

3. A paving material as claimed in claim 2 wherein the sludge additionally contains up to 10 percent by weight of magnesium compound, calculated as MgO and up to 10 percent by weight silicon, calculated as SiO$_2$.

4. A paving material as claimed in claim 2 wherein the sludge additionally contains up to 1 percent by weight phosphorus compound calculated as PO$_4$, and up to 2 percent by weight manganese compound calculated as MnO.

UNITED STATES PATENT OFFICE
CERTIFICATE OF CORRECTION

Patent No. 4,105,463          Dated August 8, 1978

Inventor(s) Donald I. Angelbeck

It is certified that error appears in the above-identified patent and that said Letters Patent are hereby corrected as shown below:

Col. 2, Line 19 - "hydoxides" - should be -- hydroxides

Col. 3, Line 3 - "A batch was mixed" - should be -- To a batch

Signed and Sealed this

Twenty-seventh Day of March 1979

[SEAL]

Attest:

RUTH C. MASON
*Attesting Officer*

DONALD W. BANNER
*Commissioner of Patents and Trademarks*